United States Patent [19]

Shimizu et al.

[11] Patent Number: 5,053,466
[45] Date of Patent: Oct. 1, 1991

[54] METHOD OF PREVENTING POLYMER SCALE DEPOSITION

[75] Inventors: Toshihide Shimizu, Urayasu; Ichiro Kaneko, Hazaki; Mikio Watanabe, Kamisu, all of Japan

[73] Assignee: Shin-Ftsu Chemical Co., Ltd., Tokyo, Japan

[21] Appl. No.: 446,681

[22] Filed: Dec. 6, 1989

[30] Foreign Application Priority Data

Dec. 7, 1988 [JP] Japan ................................ 63-309415
Dec. 9, 1988 [JP] Japan ................................ 63-311601
Dec. 9, 1988 [JP] Japan ................................ 63-311602

[51] Int. Cl.$^5$ ...................... C08F 2/00; C08F 118/04; C08F 120/04; C08F 122/02
[52] U.S. Cl. ...................................... 526/62; 526/173; 526/217; 526/222; 526/291; 526/317.1; 526/318.2; 526/319; 526/341; 526/344; 422/131
[58] Field of Search ................. 526/62, 173, 217, 222, 526/291, 317.1, 318.2, 319, 341, 344

[56] References Cited

U.S. PATENT DOCUMENTS 4,105,839 8/1978 Koyanagi et al. ..................... 526/62
4,542,195 9/1985 Shimizu et al. ....................... 526/62

Primary Examiner—Joseph L. Schofer
Assistant Examiner—Tom Weber
Attorney, Agent, or Firm—Oblon, Spivak, McClelland, Maier & Neustadt

[57] ABSTRACT

A method of preventing polymer scale deposition in a polymerization vessel during polymerization of a monomer having an ethylenically double bond, wherein said polymerization is carried out in a polymerization of which the inner wall has been previously coated with a coating solution comprising:

(A) an aromatic amine-based condensate,
(B) at least one member selected from the group consisting of alkali metal salts and ammonium salts of a sulfonation product prepared by sulfonation of an aromatic amine-based condensate, and
(C) at least one member selected from the group consisting of metal compounds, inorganic colloids, dyes and pigments; a scale preventive agent comprising the components (A), (B) and (C); and a polymerization vessel having a coating comprising the scale preventive agent. According the method, polymer scale deposition on the inner wall, etc. of the polymerization vessel can be effectively prevented.

18 Claims, No Drawings

METHOD OF PREVENTING POLYMER SCALE DEPOSITION

BACKGROUND OF THE INVENTION

1. Field of the Invention

The present invention relates to a method of preventing polymer scale deposition on the inner wall and so forth of a polymerization vessel during polymerization of a monomer having an ethylenically double bond.

2. Description of Prior Art

In processes of preparing polymers by polymerizing a monomer in a polymerization vessel, the problem that polymers deposit on the inner wall and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming Further, since the polymer scale contains unreacted monomer, there is a danger that the workers may be exposed to the unreacted monomer, which may give them some physical disorders.

Heretofore, there are known methods for preventing polymer scale deposition in which the inner wall and so forth are coated with various materials as polymer scale preventive agents, for example, particular polar compounds (Japanese Patent Publication (KOKOKU) No. 30343/1970); dyes or pigments (Japanese Patent Publication (KOKOKU) No. 30835/1970); particular linear or branched polyaromatic amines (Japanese Patent Publication (KOKOKU) No. 16561/1984); condensates prepared by reacting an aromatic amine compound with an aromatic nitro compound in the presence of a condensation catalyst at 100° to 250° C., or the basic form thereof produced by treatment with an alkali metal salt or ammonium compound (Japanese Patent Publication (KOKOKU) No. 30681/1985); and a quinone-amine compound with an average molecular weight of 3,000 or more prepared by subjecting an aromatic amine and an aromatic quinone to addition reaction in a solvent having a solubility parameter of 9.0 to 12.2 or a mixed solvent containing said solvent and an alcohol (Japanese Pre-examination Patent Publication (KOKAI) No. 7309/1986); and a reaction product of a phenolic compound with an aromatic aldehyde (Japanese Pre-examination Patent Publication (KOKAI) No. 54317/1980).

Further, Japanese Pre-examination Patent Publication (KOKAI) No. 210902/1983 discloses a process of polymerization of a vinyl monomer in a polymerization vessel, which comprises coating the inner wall and other parts with which the monomer comes into contact of the polymerization vessel, with an aqueous solution comprising: (I) at least one compound selected from (i) alkali metal salts and ammonium salts of sulfonic acid type or carboxylic acid type dyes, (ii) alkali metal salts and ammonium salts of organic sulfonic acids or carboxylic acids having a conjugated double bond, (iii) alkali metal salts and ammonium salts of sulfonation products prepared by sulfonation of a condensate of an aromatic amine compound with an aromatic nitro compound or a self-condensate of an aromatic amine compound, and (iv) anionic polymer electrolytes; (II) an inorganic colloid; and, optionally, (III) a compound that can react with any of said component (I) and is selected from (a) dyes, (b) organic compounds having a conjugated double bond, and (c) cationic polymer electrolytes, and drying the coated surface.

These methods are effective in preventing polymer scale deposition, in the case where the monomer to be polymerized is vinyl halide such as vinyl chloride or a monomer mixture containing a large amount of vinyl chloride and a small amount of other monomers copolymerizable therewith. However, in the case where the monomer having an ethylenically double bond to be polymerized mainly comprises styrene, α-methylstyrene, acrylate, acrylonitrile or the like, which have so high a dissolving power against the coatings formed by the above prior art methods, the coatings may be partly or completely dissolved away. Consequently, it becomes impossible to prevent the deposition of polymer scale.

Japanese Pre-examination Patent Publication (KOKAI) No. 72902/1985 discloses a process of polymerization of a monomer having an ethylenically double bond in a polymerization vessel, wherein the inner wall and other parts of the polymerization vessel with which the monomer comes into contact during polymerization have been previously coated with a coating solution comprising: (a) a condensate of an aromatic amine compound with an aromatic nitro compound, and (b) an alkali metal salt or ammonium salt of the sulfonation product prepared by sulfonation of a condensate of an aromatic amine compound with an aromatic nitro compound, followed drying. This process has an improved scale preventing effect, but one polymerization run results in polymer scale deposition in an amount of about 3 to 8 g/m$^2$. In particular, the polymerization of the monomers having high dissolving power such as styrene, α-methylstyrene, etc. results in much polymer scale; hence it is impossible to use the polymerization vessel continuously or repeatedly. That is, the operation of removing polymer scale has to be conducted every polymerization run.

SUMMARY OF THE INVENTION

Accordingly, it is an object of the present invention to provide a method of preventing polymer scale deposition on the inner wall of a polymerization vessel during polymerization of not only vinyl halide but also extensive other monomers having an ethylenically double bond.

The present inventors have discovered that the above object can be achieved by coating the inner wall with a coating solution with a particular composition.

Thus, the present invention provides, as a means of solving the prior art problems, a method of preventing polymer scale deposition in a polymerization vessel during polymerization of a monomer having an ethylenically double bond, wherein said polymerization is carried out in a polymerization vessel of which the inner wall has been previously coated with a coating solution comprising:

(A) an aromatic amine-based condensate,
(B) at least one member selected from the group consisting of alkali metal salts and ammonium salts of the sulfonation product prepared by sulfonation of an aromatic amine-based condensate, and (C) at least one member selected from the group consisting of metal compounds, inorganic colloids, dyes and pigments.

The present invention also provides the polymerization vessel of which the inner wall has a coating comprising said components (A), (B) and (C).

Further, the present invention provides a polymer scale preventive agent comprising said components (A), (B) and (C).

According to the present invention, polymer scale deposition can be effectively prevented in the polymerization of monomers having an ethylenically double bond. Particularly, even in the case of polymerizing monomers having high dissolving power such as styrene, α-styrene acrylates and acrylonitrile, polymer scale deposition can be prevented. Therefore, the operation of removing polymer scale is not required to be conducted every polymerization run; hence productivity is markedly improved. And polymers of high quality can be produced stably.

DETAILED DESCRIPTION

Component (A)

The aromatic amine-based condensate, the component (A) of the coating solution, herein means a selfcondensation product of an aromatic amine, or a cocondensation product of an aromatic amine with one or more of other compounds such as an aromatic nitro compound, an aromatic quinone compound, an azo compound, a nitroso compound and a polyhydricphenol. Such aromatic amine-based condensates include, for example, the following compounds.

(1) The condensate prepared by reacting an aromatic amine compound with an aromatic nitro compound in the presence of a condensation catalyst at 100° to 250° C., or the basic form thereof produced by treatment with an alkali metal salt or ammonium compound, disclosed in Japanese Patent Publication (KOKOKU) No. 30681/1985.

The aromatic amine compound used as a starting material is represented by the general formula (I):

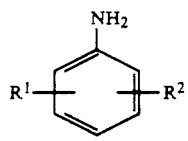

(I)

wherein $R^1$ represents a hydrogen atom, $-NH_2$, $-Cl$, $-N=N-C_6H_5$, $-OH$, $-COCH_3$, $-OCH_3$, $-NH-C_6H_5$, $-NH-C_6H_4-NH_2$, $-NH-C_6H_4-OCH_3$, $-N(CH_3)_2$, $-NH-C_6H_4-OH$, $-NH-CO-CH_3$ or an alkyl group having 1 to 3 carbon atom; and $R^2$ represents a hydrogen atom, $-NH_2$, $-OH$ or $-CH_3$.

The aromatic amine compound having the general formula (I) includes, for example, aniline, o-, m- or p-phenylenediamine, o-, m- or p-aminophenol, o-, m- or p-chloroaniline, p-aminoazobenzene, 2,4-diaminoazobenzene, p-aminoacetoanilide, o-, m- or p-methylaniline, 4-aminodiphenylamine, 2-aminodiphenylamine, 4,4-diaminodiphenylamine, N,N-dimethyl-p-phenylenediamine, 4-amino-3'-methoxydiphenylamine, 4-amino-4'-hydroxydiphenylamine, 4-chloro-o-phenylenediamine, 4-methoxy-o-phenylenediamine, 2-amino-4-chlorophenol, and 2,3-diaminotoluene.

The aromatic nitro compound used as another starting material is represented by the general formula:

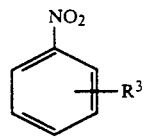

(II)

wherein $R^3$ represents a hydrogen atom, $-OH$, $-OCH_3$, $-OC_2H_5$, $-Cl$, $-NH_2$, $-COOH$, or $-SO_3H$.

The aromatic nitro compound having the general formula (II) includes, for example, nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, nitrobenzene, o-, m- or p-nitrobenzenesulfonic acid, o-, m- or p-nitroaniline, 2-nitro-p-phenylenediamine, 2-amino-4-nitrophenol, 2-amino-5-nitrophenol, and 4-amino-2-nitrophenol.

According to the preparation process described in Japanese Patent Publication (KOKOKU) No. 30681/1985, first, at least one of the aromatic amine compounds of the general formula (I) and at least one of the aromatic nitro compounds of the general formula (II) are subjected to condensation reaction in the presence of a mineral acid and a condensation catalyst at a temperature of from 100° to 250° C. to produce the condensate of these two compounds. The aromatic nitro compound is preferably used in an amount of 0.15 to 0.50 mole per mole of the aromatic amine compound. The condensation catalyst is preferably used in an amount of 0.10 to 0.50 mole, and the mineral acid is used in an amount of 0.20 to 0.50 mole, per mole of the aromatic amine compound. The mineral acid used includes, for example, hydrochloric acid, nitric acid, oxalic acid, phosphoric acid and sulfuric acid. The condensation catalyst used includes, for example, permanganic acid and its salts such as potassium permanganate, chromic acid related compounds such as chromium trioxide, potassium dichromate and sodium chlorochromate, nitric acid and its salts such as silver nitrate and lead nitrate, halogens such as iodine, bromine, chlorine and fluorine, peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide, oxy acids and the salts thereof such as iodic acid, potassium iodate and sodium chlorate, metal salts such as ferrous chloride, ferric chloride, copper sulfate, cuprous chloride, cupric chloride and lead acetate, oxygen compounds such as molecular oxygen and ozone, oxides such as copper oxides, mercury oxides, cerium oxides, manganese dioxide and osmic acid.

The basic form of the above condensate is prepared by, for example, dispersing 100 parts by weight of said condensate in water, adding 10 to 20 parts by weight of an alkali or ammonium compound to the dispersion, and then heating the mixture at 90° to 140° C. The amount of the alkali or the ammonium compound may be enough to neutralize the mineral acid used in the condensation. The alkali or the ammonium compound used includes, for example, NaOH, KOH, $Na_2CO_3$, $NH_4OH$, $(NH_4)_2CO_3$, and the like.

Among the condensates of the aromatic amine compound with the aromatic nitro compound, and the basic forms thereof, preferred are, for example, condensates of aniline with nitrobenzene, condensates of aniline and -p-aminodiphenylamine with nitrobenzene, condensates of aniline and o-aminophenol with o-oxynitrobenzene, and condensates of aniline and p-animophenol with o-oxynitrobenzene. Specifically Condensate Nos. 3, 5, 7, 10, 17 and 18 are preferable examples.

(2) The linear or branched polyaromatic amine with a molecular weight of about 250 or more described in Japanese Patent Publication (KOKOKU) No. 16561/1984 and Japanese Patent Publication (KOKOKU) No. 54323/1985.

This polyaromatic amine includes the ones represented by the following formulas (III) or (IV).

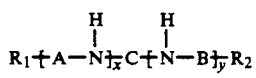
(III)

wherein $R_1$ and $R_2$ may be the same or different and each represent a hydrogen atom, —OH, —$NH_2$, or the group:

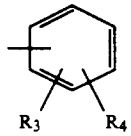

where $R_3$ and $R_4$ may be the same or different and each represent a hydrogen atom, —OH, —$NH_2$, a halogen atom, or an alkyl group having 1 to 8 carbon atoms, and A, B and C may be the same or different and each represent the group:

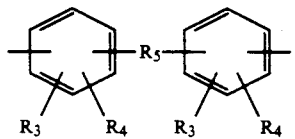

where $R_3$ and $R_4$ are the same as defined above, and $R_5$ is

or a linear or branches alkylene group or alkylidene group having 1 to 5 carbon atoms, or the group:

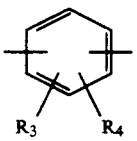

where $R_3$ and $R_4$ are the same as defined above, x is an integer of from 1 to 20, and y is an integer of from 0 to 20, and each repeated unit may be the same or different.

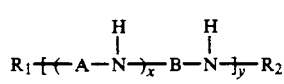
(IV)

wherein $R_1$, A and B are the same as defined in respect of said formula (III), $R_2$ represents a hydrogen atom, —OH or the group:

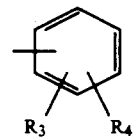

where $R_3$ and $R_4$ are the same as defined in respect of said formula (III), x is an integer of from 1 to 4, and y is an integer of from 1 to 15.

Said polyaromatic amine can be prepared by subjecting one or more of the compounds (a) to (d) described below to condensation, provided that if only one compound is used, it must have an amino group; if two or more compounds are used, at least one of them must have an amino group. In the case where 3 or more of compounds are used, at least two thereof preferably have an amino group.

(a) The polyaminobenzene having the formula:

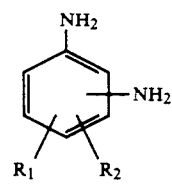

wherein $R_1$ and $R_2$ may be the same or different and each represent a hydrogen atom, a halogen atom such as a chlorine, bromine, iodine or fluorine atom, —$NH_2$, —OH, or an alkyl group having 1 to 8 carbon atoms, Examples of this polyaminobenzene include o-, m- or p-phenylenediamine; diaminotoluene, diaminoxylene, diaminophenol, and triaminobenzene, toluene, and xylene; ethyl, proplyl, butyl or pentyl-di or tri-aminobenzene. Most preferred are the compounds in which R is a hydrogen atom, and $R_2$ is a hydrogen atom, the methyl group, or the ethyl group.

(b) The polyhydric phenol having the formula:

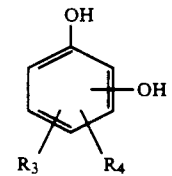

wherein $R_3$ and $R_4$ may be the same or different and each represent a hydrogen atom, a halogen atom such as a chlorine, bromine, iodine or fluorine atom, —$NH_2$, —OH, or an alkyl group having 1 to 8 carbon atoms, Examples of this polyhydric phenol include catecol, resorcinol, chlororesorcinol, hydroquinone, phloroglucinol, pyrogallol, and the like; dihydroxy-toluene or -xylene; trihydroxy-toluene or -xylene; etyl, propyl, butyl or pentyl-di or tri-hydroxybenzene and the like. Most preferred are the compounds in which $R_3$ is a hydrogen atom, and $R_4$ is a hydrogen atom or —OH.

(c) The amino phenol or the alkyl-substituted amino phenol . aving the formula:

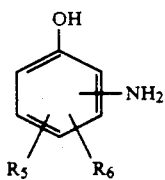

wherein $R_5$ and $R_6$ may be the same or different and each represent a hydrogen atom, a halogen atom such as a chlorine, bromine, iodine or fluorine atom, —$NH_2$, —OH, or an alkyl group having 1 to 8 carbon atoms. Examples of the compound include o-, m- or p-aminophenol; diamino- to triamino-phenols; and methyl- ethyl-, propyl-, butyl- or pentyl-amino or diaminophenols. Most preferred are the compounds in which $R_5$ is a hydrogen atom, and $R_6$ is a hydrogen atom or —$NH_2$.

(d) Diphenyl amine, alkyl-substituted diphenylamines, and the compound having the following formula:

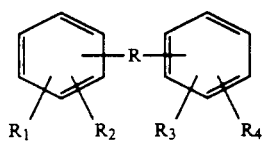

wherein R represents

or a linear or branched alkyl group having 1 to 5 carbon atoms, and $R_1$, $R_2$, $R_3$ and $R_4$ are each represent a hydrogen atom, a halogen atom such as a chlorine, bromine, iodine or fluorine atoms, —$NH_2$, —OH or an alkyl group having 1 to 8 carbon atoms, provided that at least two o them are —$NH_2$ or —OH.

The compound of the above formula includes, for example, bisphenol A. Most preferred are the compounds in which $R_1$ and $R_4$ are —OH or —$NH_2$, and $R_2$ and $R_3$ are a hydrogen atom.

Among the polyaromatic amines described above, preferred are those prepared by subjecting a reactant mixture containing said polyaminobenzene and said polyhydric phenol to condensation together; for example, the condensate of m-phenylenediamine and resorcinol, the condensate of m-phenylenediamine, resorcinol and p-aminophenol; and the condensate of m-phenylenediamine, resorcinol, phloroglucinol and p-aminophenol.

The above condensation is usually carried out in the presence of an acid catalyst such as hydrochloric acid under heating. Preferable reaction conditions about the acid catalyst, catalyst concentration, etc. are described in detail in Japanese Patent Publication (KOKOKU) No. 16561/1984.

(3) The quinone-amine compound with an average molecular weight of 3,000 or more prepared by addition reaction of an aromatic diamine with an aromatic quinone in a solvent having a solubility parameter of 9.0 to 12.2 or a mixed solvent containing said solvent and an alcohol in an amount not more than that of said solvent (Japanese Pre-examination Patent Publication (KOKAI) No. 7309/1986).

The aromatic quinone used in the preparation of said quinone-amine compound includes, for example, benzoquinones, naphthoquinones, phenanthrenequinone, and their derivatives formed by substitution on an aromatic ring with at least one of a chlorine atoms, bromine atom, methyl group, alkoxyl group, and hydroxyl group.

The aromatic diamine includes, for example, phenylene diamines, diaminonaphthalenes, diaminoacridines, diaminopyridines, diaminopyrimidines, diaminofluroenes, diaminoazobenzenes, diaminobenzidines and diaminodiphenylamines, and their derivatives formed by substitution on the ring with an alkyl group, aryl group, alkoxyl group, halogen atom, hydroxyl group, mercapto group, nitro group, etc.

The solvent having a solubility parameter of 9.0 to 12.2 used includes, for example, polar non-protonic solvents such as tetrahydrofuran, dimethylformamide, dimethyl acetamide, actonitrile, acetone, methyl ethyl ketone, diethyl ketone, methyl isobutyl ketone, methyl n-butyl ketone, methyl n-propyl ketone, and dioxane. These may be used singly or in combination of one or more. The alcohol which may be added optionally includes, for example, methanol and ethanol, which can be used suitably. The selection of solvent or addition of alcohol makes it possible to control the molecular weight of the quinone-amine compounds formed.

The reaction of the aromatic diamine with the aromatic quinone is normally conducted at 10° to 70° C. The aromatic quinone is normally used in an amount of about 1 to 5 moles per mole of the aromatic diamine. Other reaction conditions are described in detail in Japanese Pre-examination Patent Publication (KOKAI) No. 7309/1986.

Among the quinone-amine compounds, preferred are the condensate of diaminonaphthalene with benzoquinone, the condensate of phenylenediamine with benzoquinone, and the condensate of diaminodiphenylamine with benzoquinone.

The aromatic amine-based condensates described above can be used singly or in combination of two or more as the component (A).

Component (B)

The compound used as the component (B) is an alkali metal salt or an ammonium salt of the sulfonation product prepared by sulfonation of said aromatic amine-based condensate which can used as the component (A). (This salt of the sulfonation product is hereinafter called "condensate salt".)

The condensate salt includes, for example, the one disclosed in Japanese Patent Publication (KOKOKU) No. 30682/1985, which is an alkali metal salt or an ammonium salt of the sulfonation product prepared by sulfonation of the condensate of an aromatic amine compound with an aromatic nitro compound as disclosed in Japanese Patent Publication (KOKOKU) No. 30681/1985 as mentioned above. The aromatic amine-based condensates including the ones disclosed in said Japanese Patent Publication (KOKOKU) No. 1651/1984 and Japanese Pre-examination Patent Publication (KOKAI) No. 7309/1985 can be generally converted into condensate salts by sulfonation followed by reaction with an alkali metal compound or ammonium compound.

The sulfonation of the aromatic amine-based condensate may be carried out in conventional manners. For example, the condensate is reacted with a sulfonation agent such as sulfuric acid, fuming sulfuric acid and chlorosulfonic acid in an amount from 2 to 15 times by weight by condensate at a temperature of from 35° to 90° C., thereby the sulfonation product being obtained. Thereafter, the sulfonation product thus obtained is reacted with an alkali metal compound such as NaOH, KOH and $Na_2CO_3$ or an ammonium compound such as $NH_4OH$ and $(NH_4)_2CO_3$ to produce the desired condensate salt. Specifically, for example, this reaction may be carried out by adding the alkali metal compound or ammonium compound to the sulfonation product dispersed in water under heating. The condensate salt thus prepared is water soluble; hence it is obtained in a dissolved form in the aqueous medium, but it can be converted into a dry powdery solid form by evaporation to dryness followed by grinding.

The condensate salts described above can be used singly or in combination of two or more as the component (B).

Among the condensate salts described above, preferred are the ones derived from the aromatic amine-based condensates that are described as a preferred component (A) above. That is, condensate salts derived from the condensate of aniline with nitrobenzene, the condensate of aniline and p-aminodiphenylamine with nitrobenzene, the condensate of aniline and o-aminophenol with o-oxynitrobenzene, and the condensate of aniline and p-aminophenol with o-oxynitrobenzene; condensate salts derived from the condensate of m-phenylenediamine and resorcinol, the condensate of m-phenylenediamine, resorcinol and p-aminophenol, and the condensate of m-phenylenediamine, resorcinol, phloroglucinol and p-aminophenol; and condensate salts derived from the condensate of diaminonaphthalene with benzoquinone, the condensate of phenylenediamine with benzoquinone, and the condensate of diaminodiphenylamine with benzoquinone.

Component (C)

The component (C) of the coating solution comprises at least one member selected from the group consisting of metal compounds, inorganic colloids, dyes and pigments.

Preferably, the component (C) comprises at least one member selected from the group consisting of metal compounds and inorganic colloids, and at least one member selected from the group consisting of dyes and pigments. According to this preferred embodiment, scale preventing action of the coating obtained will be enhanced synergistically; polymer scale deposition can be prevented more effectively.

Metal compounds and inorganic colloids

The metal compound which may be used includes, for example, silicates, carbonates, phosphates, sulfates, nitrates, borates, acetates, hydroxides, oxides and halides or metals such as alkaline metals such as sodium and potassium, alkaline earth metals such as magnesium, calcium and barium, aluminum family metals such as aluminum, tin family metals such as titanium and tin, iron family metals such as iron and nickel, chromium family metals such as chromium and molybdenum, manganese family metals such as manganese, copper family metals such as copper and silver, platinum family metals such as platinum.

Among the metal compounds, preferred are silicates of magnesium, calcium, aluminum and titanium; phosphates of magnesium, calcium, barium and titanium; sulfates of titanium, tin, iron and nickel; and hydroxides of magnesium, calcium, aluminum and iron.

The inorganic colloid which may be used includes, for example, gold colloid, silver colloid, sulfur colloid, colloid of ferric hydroxide, colloid of stannic acid, colloid of silicic acid, colloid of manganese dioxide, colloid of molybdenum oxide, colloid of barium sulfate, colloid of vanadium pentoxide, colloid of aluminum hydroxide, and colloid of lithium silicate. These inorganic colloids can be prepared by mechanical crushing, irradiation with ultrasonic wave, electrical dispersion or chemical methods.

Among the inorganic colloids, preferred are colloid of ferric hydroxide, colloid of aluminum hydroxide, colloid of stannic acid, colloid of silicic acid, colloid of aluminum hydroxide, and colloid of lithium silicate.

These metal compounds and inorganic colloids can be used singly or in combination of two or more.

Dyes and pigments

The dyes and pigments which may be as the component (C) are exemplified as follows:

azo dyes such as monoazo and polyazo dyes and pigments, metal complex azo dyes and pigments, stilbene azo pigments, and thiazole azo dyes;

anthraquinone dyes and pigments such as anthraquinone derivatives, and anthrone derivatives;

indigoid dyes and pigments such as indigo derivatives, and thioindigo derivatives;

phthalocyanine dyes and pigments;

carbonium dyes and pigments such as diphenylmethane dyes, triphenylmethane dyes and pigments, xanthene dyes, and acridine dyes;

quinoneimine dyes such as azine dyes, oxazine dyes, and thiazine dyes;

methine dyes such as polymethine or cyanine dyes;

quinoline dyes;

nitro dyes;

benzoquinone and naphthoquinone dyes;

naphthalimide dyes and pigments;

perinone dyes;

sulfide dyes;

fluorescent dyes;

azoic dyes; and reactive dyes.

These can be used either singly or in combination of two or more. More specifically, typical examples of these dyes and pigments are enumerated below.

(1) Azo dyes and pigments include the following compounds.

Exemplary monoazo and polyazo dyes are C.I. Basic Yellow 32, 34 and 36; C.I. Basic Orange 2, 32, 33 and 34; C.I. Basic Red 17, 18, 22, 23, 24, 32, 34, 38, 39 and 40; C.I. Basic Violet 26 and 28; C.I. Basic Blue 58, 59, 64, 65, 66, 67 and 68; C.I. Basic Brown 1, 4, 11 and 12; C.I. Basic Black 8; C.I. Azoic Diazo Component 4, 21, 27 and 38; C.I. Disperse Yellow 3, 4, 5, 7, 8, 23, 50, 60, 64, 66, 71, 72, 76, 78 and 79; C.I. Disperse Orange 1, 3, 5, 13, 20, 21, 30, 32, 41, 43, 45, 46, 49, 50 and 51; C.I. Disperse Red 1, 5, 7, 12, 13, 17, 43, 52, 54, 56, 58, 60, 72, 73, 74, 75, 76, 80, 82, 84, 88, 90, 97, 99, 101, 103, 113, 117, 122, 125, 126, 128 and 129; C.I. Disperse Violet 10, 24, 33, 38, 41, 43 and 96; C.I. Disperse Blue 85, 92, 94 and 106; C.I. Disperse Brown 3 and 5; C.I. Disperse Black 1, 2, 10, 26, 27, 28, 29, 30 and 31; C.I. Solvent Yellow 2, 6, 14, 15, 16, 19, 21 and 56; C.I. Solvent Orange 1, 2, 5, 6, 14 and 45; C.I. Solvent Red 1, 3, 23, 24, 25, 27 and 30; C.I. Solvent Brown 3, 5 and 20; C.I. Solvent Black 3; C. I. Pigment Yellow 1, 2, 3, 4, 5, 6, 7, 10, 11, 12, 13, 14, 15, 16, 17, 23, 65, 73 and 83; C.I. Pigment Orange 1, 2, 5, 13, 14, 15, 16, 17, 24 and 31; C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 112, 114 and 163; C.I. Pigment Blue 25; C.I. Pigment Green 10; C.I. Pigment Brown 1 and 2; C.I. Pigment Black 1; C.I. Direct Yellow 1, 8, 11, 12, 24, 26, 27, 28, 33, 44, 50, 58, 85, 86, 87, 88, 89, 98, 100 and 110; C.I. Direct Orange 1, 6, 8, 10, 26, 29, 39, 41, 49, 51, 57, 102 and 107; C.I. Direct Red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; C.I. Direct Violet 1, 7, 9, 12, 22, 35, 51, 63, 90, 94, and 98; C.I. Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 and 249; C.I. Direct Green 1, 6, 8, 28, 30, 31, 33, 37, 59, 63, 64 and 74; C.I. Direct Brown 1A, 2, 6, 25, 27, 44, 58, 59, 101, 106, 173, 194, 195, 209, 210 and 211; C.I. Direct Black 17, 19, 22, 32, 38, 51, 56, 71, 74, 75, 77, 94, 105, 106, 107, 108, 112, 113, 117, 118, 132, 133 and 146; C.I. Acid Yellow 11, 17, 19, 23, 25, 29, 36, 38, 40, 42, 44, 49, 61, 70, 72, 75, 76, 78, 79, 110, 127, 131, 135, 141, 142, 164, and 165; C.I. Acid Orange 1, 7, 8, 10, 19, 20, 24, 28, 33, 41, 43, 45, 51, 56, 63, 64, 65, 67, and 95; C.I. Acid Red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 133, 134, 138, 143, 145, 154, 155, 158, 168, 249, 252, 254, 257, 262, 265, 266, 274, 276, 282, 283 and 303; C.I. Acid Violet 7, 11, 97 and 106; C.I. Acid Blue 29, 60, 92, 113, 117 and 120; C.I. Acid Green 19, 20 and 48; C.I. Acid Brown 2, 4, 13, 14, 20, 53, 92, 100, 101, 236, 247, 266, 268, 276, 277, 282, 289, 301 and 302; C.I. Acid Black 1, 7, 24, 26, 29, 31, 44, 76, 77, 94, 109 and 110; C.I. Mordant Yellow 1, 3, 5, 23, 26, 30, 38 and 59; C.I. Mordant Orange 1, 4, 5, 6, 8, 29 and 37; C.I. Mordant Red, 7, 9, 17, 19, 21, 26, 30, 63 and 89; C.I. Mordant Violet 5 and 44; C.I. Mordant Blue 7, 13, 44, 75 and 76; C.I. Mordant Green 11, 15, 17 and 47; C.I. Mordant Brown 1, 14, 15, 19, 21, 33, 38, 40, 52 and 87; C.I. Mordant Black 1, 3, 7, 9, 11, 17, 26, 32, 38, 43, 44, 51, 54, 65, 75, 77, 84, 85, 86 and 87; C.I. Food Yellow 3 and 4; C.I. Food Red 7 and 9;

exemplary metal complex azo dyes are C.I. Solvent Yellow 61 and 80; C.I. Solvent Orange 37, 40 and 44; C.I. Solvent Red 8, 21, 83, 84, 100, 109 and 121; C.I. Solvent Brown 37; C.I. Solvent Black 23; C.I. Acid Black 51, 52, 58, 60, 62, 63, 64, 67, 72, 107, 108, 112, 115, 118, 119, 121, 122, 123, 131, 132, 139, 140, 155, 156, 157, 158, 159 and 191; C.I. Acid Yellow 59, 98, 99, 111, 112, 114, 116, 118, 119, 128, 161, 162 and 163; C.I. Acid Orange 74, 80, 82, 85, 86, 87, 88, 122, 123 and 124; C.I. Acid Red 180, 183, 184, 186, 194, 198, 199, 209, 211, 215, 216, 217, 219, 256, 317, 318, 320, 321 and 322; C.I. Acid Violet 75 and 78; C.I. Acid Blue 151, 154, 158, 161, 166, 167, 168, 170, 171, 175, 184, 187, 192, 199, 229, 234 and 236; C.I. Acid Green 7, 12, 35, 43, 56, 57, 60, 61, 65, 73, 75, 76, 78 and 79; C.I. Acid Brown 19, 28, 30, 31, 39, 44, 45, 46, 48, 224, 225, 226, 231, 256, 257, 294, 295, 296, 297, 299 and 300; C.I. Direct Yellow 39; C.I. Direct Violet 47 and 48; C.I. Direct Blue 90, 98, 200, 201, 202 and 226; C.I. Direct Brown 95, 100, 112 and 170;

an exemplary stilbene azo dye is C.I. Direct Black 62; and exemplary thiazole azo dyes are C.I. Direct Red 9 and 11.

(2) Anthraquinone dyes and pigments include the following compounds.

Exemplary anthraquinone derivatives are C.I. Basic Violet 25; C.I. Basic Blue 21, 22, 44, 45, 47, 54 and 60; C.I. Azoic Diazo Component 36; C.I. Vat Yellow 2, 3, 10, 20, 22 and 33; C.I. Vat Orange 13 and 15; C.I. Vat Red 10, 13, 16, 31, 35 and 52; C.I. Vat Violet 13 and 21; C. I. Vat Blue 4, 6, 8, 12, 14, 64, 66, 67 and 72; C.I. Vat Green 8, 13, 43, 44 and 45; C.I. Vat Brown 1, 3, 22, 25, 39, 41, 44, 46, 57, 68, 72 and 73; C.I. Vat Black 8, 14, 20, 25, 27, 36, 56, 59 and 60; C.I. Disperse Orange 11; C.I. Disperse Red 4, 9, 11, 15, 53, 55, 65, 91, 92, 100, 104, 116 and 127; C.I. Disperse Violet 1, 4, 8, 23, 26, 28, 30 and 37; C.I. Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 and 105; C.I. Disperse Yellow 51; C.I. Solvent Violet 13 and 14; C.I. Solvent Blue 11, 12, 35 and 36; C.I. Solvent Green 3; C.I. Pigment Red 83 and 89; C.I. Pigment Blue 22; C.I. Acid Violet 31, 34, 35, 41, 43, 47, 48, 51, 54, 66 and 68; C.I. Acid Blue 23, 25, 27, 40, 41, 43, 45, 54, 62, 72, 78, 80, 82, 112, 126, 127, 129, 130, 131, 138, 140, 142, 143, 182, 183, 203, 204 and 205; C.I. Acid Green 25, 27, 28, 36, 40, 41 and 44; C.I. Acid Brown 27; C.I. Acid Black 48 and 50; C.I. Mordant Red 3 and 11; C.I. Mordant Blue 8 and 48; C.I. Mordant Black 13; C.I. Pigment Violet 5;

exemplary anthrone derivatives are C.I. Vat Yellow 1 and 4; C.I. Vat Orange 1, 2, 3, 4 and 9; C.I. Vat Violet 1, 9 and 10; C.I. Vat Blue 18, 19 and 20; C.I. Vat Green 1, 2, 3 and 9; C.I. Vat Black 9, 13, 29 and 57; C.I. Vat Red 13; C.I. Acid Red 80, 82 and 83.

(3) Indigoid dyes and pigments include the following compounds.

Exemplary indigo derivatives are C.I. Vat Blue 1, 3, 5, 35 and 41; C.I. Reduced Vat Blue 1; C.I. Pigment Violet 19 and 122; C.I. Acid Blue 74 and 102; C.I. Solubilized Vat Blue 5 and 41; C.I. Solubilized Vat Black 1; C.I. Food Blue 1;

exemplary thioindigo derivatives are C.I. Vat Orange 5; C.I. Vat Red 1, 2 and 61; C.I. Vat Violet 2 and 3; C.I. Pigment Red 87 and 88; C.I. Vat Brown 3.

(4) Phthalocyanine dyes and pigments may include, for example, C.I. Solvent Blue 55; C.I. Pigment Blue 15, 16 and 17; C.I. Pigment Green 36, 37 and 38; C.I. Direct Blue 86 and 199; C.I. Mordant Blue 58.

(5) Carbonium dyes and pigments include the following compounds.

An exemplary diphenylmethane dye is C.I. Basic Yellow 2;

exemplary triphenylmethane dyes are C.I. Basic Red 9; C.I. Basic Violet 1, 3 and 14; C.I. Basic Blue 1, 5, 7, 19, 26, 28, 29, 40 and 41; C.I. Basic Green 1 and 4; C.I. Solvent Violet 8; C.I. Solvent Blue 2 and 73; C.I. Pigment Violet 3; C.I. Pigment Blue 1, 2 and 3; C.I. Pigment Green 1, 2 and 7; C.I. Direct Blue 41; C.I. Acid Violet 15 and 49; C.I. Acid Blue 1, 7, 9, 15, 22, 83, 90, 93, 100, 103 and 104; C.I. Acid Green 3, 9 and 16; C.I. Mordant Violet 1; C.I. Mordant Blue 1, 29 and 47; C.I. Food Violet 2; C.I. Food Blue 2; C.I. Food Green 2;

exemplary xanthene dyes are C.I. Basic Red 1; C.I. Solvent Red 49; C.I. Pigment Red 81 and 90; C.I. Pigment Violet 1, 2 and 23; C.I. Acid Red 51, 52, 87, 92 and 94; C.I. Mordant Red 15 and 27; C.I. Food Red 14; and exemplary acridine dyes are C.I. Basic Orange 14 and 15.

(6) Quinoimine dyes include the following compounds.

Exemplary azine dyes are C.I. Basic Red 2; C.I. Basic Black 2; C.I. Solvent Black 5 and 7; C.I. Acid Blue 59; C.I. Acid Black 2;

exemplary oxiazine dyes are C.I. Basic Blue 3; C.I. Direct Blue 106 and 108;

exemplary thiazine dyes are C.I. Basic Yellow 1; C.I. Basic Blue 9, 24 and 25.

(7) Methine dyes include the following compounds.

Exemplary polymethine (or cyanine) dyes are C.I. Basic Yellow 11, 13, 14, 19, 21, 25, 28, 33 and 35; C.I. Basic Orange 21 and 22; C.I. Basic Red 12, 13, 14, 15, 27, 29, 35, 36 and 37; C.I. Basic Violet 7, 15, 21 and 27.

(8) Quinoline dyes may be exemplified by C.I. Basic Green 6; C.I. Disperse Yellow 54 and 56; C.I. Solvent Yellow 33; C.I. Acid Yellow 3.

(9) Nitro dyes may be exemplified by C.I. Disperse Yellow 1, 33, 39, 42, 49 and 54; C.I. Acid Yellow 1.

(10) Benzoquinone and naphthoquinone dyes may be exemplified by C.I. Disperse Blue 58 and 108; C.I. Acid Brown 103, 104, 106, 160, 161, 165 and 188.

(11) Naphthalimide dyes and pigments may be exemplified by C.I. Pigment Red 123; C.I. Vat Violet 23 and 39; C.I. Acid Yellow 7.

(12) Perinone dyes may be exemplified by C.I. Vat Orange 7 and 15.

(13) Sulfide dyes may include, for example C.I. Solubilized Sulfur Yellow 2; C.I. Sulfur Yellow 4; C.I. Sulfur Orange 3, C.I. Sulfur Red 2, 3, 5 and 7; C.I. Solubilized Sulfur Blue 15; C.I. Sulfur Blue 2, 3, 4, 6, 7, 9 and 13; C.I. Sulfur Green 2, 3, 6, 14 and 27; C.I. Solubilized Sulfur Brown 1 and 51; C.I. Sulfur Brown 7, 12, 15 and 31; C.I. Sulfur Black 1, 2, 5, 6, 10 11 and 15; C.I. Vat Yellow 35, 42 and 43; C.I. Vat Blue 43 and 56.

(14) Fluorescent dyes may include, for example, C.I. Fluorescent brightening agents 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 and 177.

(15) Azoic dyes may include, for example, C.I. Azoic Diazo Component 17, 20, 22, 24, 26, 31, 35, 41, 47, 48, 109 and 121; C.I. Azoic Coupling Component 2, 3, 4, 5, 7, 8, 10, 11, 12, 14, 15, 16, 17, 18, 19, 20, 23, 26, 28, 29, 35, 36, 37, 41 and 108; C.I. Azoic Brown 2, 7, 11 and 15; C.I. Azoic Black 1 and 5; C.I. Azoic Yellow 1 and 2; C.I. Azoic Orange 2, 3 and 7; C.I. Azoic Red 1, 2, 6, 9, 16 and 24; C.I. Azoic Violet 1, 2, 6, 7, 9 and 10; C.I. Azoic Green 1.

(16) Reactive dyes may include, for example, C.I. Reactive Yellow 1, 2, 3, 4, 6, 7, 11, 12, 13, 14, 15, 16, 17, 18, 22, 23, 24, 25, 26, 27, 37 and 42; C.I. Reactive Orange 1, 2, 4, 5, 7, 13, 14, 15, 16, 18, 20, 23 and 24; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; C.I. Reactive Violet 1, 2, 4, 5, 8, 9 and 10; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; C.I. Reactive Green 5, 6, 7 and 8; C.I. Reactive Brown 1, 2, 5, 7, 8, 9, 10, 11, 14 and 16; C.I. Reactive Black 1, 3, 4, 5, 6, 8, 9, 10, 12, 13, 14 and 18.

Further, pigments may be exemplified by inorganic pigments such as Chrome Yellow, Zinc Yellow, ZTO type zinc chromate, red lead, iron oxide powder, zinc white, aluminum powder and zinc powder Among the above dyes and pigments, preferred are quinoneimine dyes. More preferred are azine dyes. In particular, C.I. Basic Red 2, C.I. Basic Black 2, C.I. Solvent Black 5 and 7, C.I. Acid Blue 5 and 9, and C.I. Acid Black 2 are most preferable examples.

Preparation of the coating solution

The coating solution used in the present method can be prepared by dissolving or dispersing the components (A), (B) and (C) in a suitable solvent. The total concentration of the components (A), (B) and (C) may be generally from about 0.01% by weight to about 5% by weight, preferably from 0.05 to 2% by weight. The component (B) is normally present in an amount of from 1 to 500 parts by weight, preferably from 5 to 300 parts by weight per 100 parts by weight of the component (A), and the component (C) is present in an amount of from 5 to 1,000 parts by weight, preferably from 15 to 500 parts by weight per 100 parts by weight of the component (A).

According to the method of the present invention, the use of the components (A), (B) and (C) in combination is essential in order to prevent polymer scale deposition effectively and certainly. However, if the component (B) is present in too large or small an amount in the coating solution relative to that of the component (A), The component (A) may agglutinate, resulting in an irregular coating, or the coating formed may be dissolved away when washed with water. If the component (C) is present in too large or small an amount in the coating solution with respect to the component (A), the scale preventing action due to the combined use of the components (A) and (C) may not be obtained. In the case where the component (C) comprises (C)-1: at least one member of the metal compounds and the inorganic colloids and (C)-2: at least one member of the dyes and pigments, the ratio of the (C)-1/(C)-2 is preferably 1/100 to 1,000/100, more preferably 5/100 to 500/100. In this range, polymer scale can be prevented more effectively.

In preparing the coating solution in the present method, there is no limitation on the order of the dissolving or dispersing of the components (A), (B) and (C) in a solvent; the three components may be dissolved or dispersed stimulanously or one by one. Any other orders are acceptable.

The solvent used for preparation of the coating solution include, for example, water; alcohols such as methanol, ethanol, propanol, 1-butanol, 2-butanol, 2-methyl-1-propanol, 2-methyl-2-propanol, 3-methyl-1-butanol, and 2-methyl-2-butanol, 2-pentanol; aliphatic hydrocarbons such as n-hexane, n-heptane and the like; aromatic hydrocarbons such as benzene, toluene, and xylene; halogenated hydrocarbons such as chloroethylene, 1-chlorobutane, chloropentane, dichloroethylene, and 1,1,2-trichloroethane; ketones such as acetone, methyl ethyl ketone, and methyl isobutyl ketone; esters such as methyl formate, ethyl formate, methyl acetate, and methyl acetoacetate; ethers such as 4-methyl dioxolan, and ethylene glycol diethyl ether; furans; and aprotic solvents such as dimethylformamide, dimethyl sulfoxide, and acetonitrile. These solvents are appropriately used singly or as a mixed solvent of two or more.

Formation of coating

The coating solution is applied on the inner wall surface of the polymerization vessel, followed by drying to form a coating comprising the scale preventive agent. Drying may be carried out, for example, at a temperature of from room temperature to 100° C. The coating solution is preferably applied to other parts of the polymerization vessel with which the monomer comes into contact during polymerization, in addition to the inner wall. Such parts include, for example, stirring blades, a stirring shaft, a condenser, a header, baffles, search coils, bolts, nuts, etc.

Moreover, preferably, the coating solution is also applied to parts of recovery system for an unreacted monomer with which the unreacted monomer may come into contact, for example, the inner surfaces of monomer distillation columns, condensers, monomer stock tanks and valves. Scale formation can be thereby prevented at these parts.

The method of applying the coating solution is not particularly limited, and includes typically the brush coating, spray coating, the method of filing the polymerization vessel with the coating solution followed by withdrawal thereof, and automatic coating methods as disclosed in Japanese Pre-examination Patent Publication (KOKAI) Nos. 61001/1982, 36288/1980 and 11303/1984, Japanese Pre-examination Publication (KOHYO) Nos. 501116/1981 and 501117/1981. The method of drying wet coated surfaces is not limited, either. Following methods can be used. For example, a method in which, after the solution is applied, air heated to a suitable temperature is blown to the coated surface to dry it, and a method in which the inner wall surface of a polymerization vessel and other parts to be coated are previously heated, and the coating solution is directly applied on the heated inner wall surface, etc. After dried, the coated surfaces are washed with water if necessary.

The coating thus formed has normally a coating weight of at least 0.001 g/m$^2$, preferably from 0.001 to 5 g/m$^2$, and more preferably 0.05 to 2 g/m$^2$.

The coating operation may be conducted every polymerization run or every several polymerization runs as necessary, thereby the polymerization vessel can be used repeatedly without deposition of polymer scale.

Polymerization

After the formation of the coating on the inner wall surface of a polymerization vessel, etc., polymerization is carried out in accordance with conventional procedures. That is, a monomer having an ethylenically double bound, a polymerization initiator, and other necessary additives such as a dispersing agent for the monomer, and optionally a polymerization medium are charged into the polymerization vessel, followed by carrying out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters of salts of these; maleic acid or fumaric acid, and esters or anhydrides thereof; and diene monomers such as butadiene, chloroprene and isoprene; as well as styrene, α-methylstyrene, acrylates, acrylonitrile, halogenated vinylidenes, and vinyl ethers.

There are no particular limitations on the form of polymerization to which the method of this invention can be applied. The invention is effective in any forms of polymerization such as suspension polymerization, emulsion polymerization, solution polymerization and bulk polymerization.

More specifically, in the case of suspension or emulsion polymerization, polymerization is generally carried out by a process comprising the steps of charging water and a dispersing agent into a polymerization vessel, charging a polymerization initiator, evacuating the inside of the polymerization vessel to a pressure of from about 0.1 mmHg to about 760 mmHg, charging a monomer (whereupon the pressure inside the polymerization vessel usually becomes from 0.5 to 30 kg.cm$^{-2}$), polymerizing the monomer at a temperature of from about $-10°$ C. to $150°$ C., and optionally adding at least one of water, the dispersing agent and polymerization initiator during polymerization. The polymerization is judged to be completed when the pressure inside the vessel falls to from about 0 to about 7 kg.cm$^{-2}$ G. The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel to a pressure of from about 0.01 mmHg to about 760 mmHg, charging a monomer, and then charging a polymerization initiator, and then carrying out polymerization at $-10°$ C. to $250°$ C.

The method of this invention is effective regardless of the materials constituting the inner wall, etc. of a polymerization vessel. That is, this method is effective for any type of polymerization vessels having inner wall made of stainless steel or glass for lining.

Accordingly, any additive materials that are commonly added in a polymerization system can be used without any limitation. More specifically, the method of this invention can effectively prevent polymers from depositing, even in polymerization systems in which such additives are present as exemplified by suspension agents such as partially saponified polyvinyl alcohol, methyl cellulose and polyacrylate; solid dispersants such as calcium phosphate and hydroxyapatite; anionic emulsifying agents such as sodium lauryl sulfate, sodium dodecylbenzenesulfonate and sodium dioctylsulfosuccinate; nonionic emulsifying agents such as sorbitan monolaurate and polyoxyethylene alkyl ether; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters; and polymerization catalysts such as diisopropyl peroxydicarbonate, α,α'-azobis-2,4-dimethylvaleronitrile, lauroyl peroxide, potassium persulfate, cumene hydroperoxide and p-menthane hydroperoxide.

The polymerization for which the method of this invention can be particularly suitably carried out include, for example, suspension polymerization or emulsion polymerization of vinyl halides such as vinyl chloride or vinylidene halides or a monomer mixture mainly comprised of any of these. The method is also suited to polymerizations for which polymerization vessels made of stainless steel are mainly used, for example, polymerizations for preparing beads or latexes of polymers such as polystyrene, polymethyl methacrylate and polyacrylonitrile, preparing synthetic rubbers such as SBR, NBR, CR and IIR (these synthetic rubbers are commonly prepared by emulsion polymerization), and preparing ABS resins.

EXAMPLES

The method of the present invention is now described by way of working examples and comparative examples. In each of the tables below, Experiment Nos. marked with * are comparative examples, and the other Experiment Nos. are working examples of the present invention.

Examples of preparation of aromatic amine-based condensates

(1) Preparation of Condensate No. 1

A mixture of 1.00 mole of aniline, 0.310 mole of hydrochloric acid, 0.227 mole of nitrobenzene and 0.103 mole of ferrous chloride was heated at 60° C. for 6 hours, and then heated up to 180°–185° C., which temperature was maintained to allow the mixture to react, with water being distilled away. During the reaction, aniline and nitrobenzene distilled together with the water. The distilled aniline and nitrobenzene were recovered and returned to the reaction vessel. Then, the inner temperature of the reaction vessel was raised to 200° C., at which the reaction mixture was heated 5 hours.

The reaction mixture obtained (the molten material) was put in a dilute sulfuric acid and heated at 60° C. for 3 hours, and then it was filtered before cooled, thereby unreacted aniline was removed. Subsequently, the product was washed with water 5 to 6 times, thereby hydrochloric acid being removed, followed by drying to give a condensate (Condensate No. 1).

(2) Preparation of Condensate No. 2

A mixture of 1.00 mole of m-phenylenediamine, 0.10 mole of hydrochloric acid and 0.83 mole of resorcinol was heated at 60° C. for 1 hour, and then heated up to 300° C. over 2 hours while ammonia generating was removed. At the time the temperature reached 300° C., cooling was started and the temperature was returned to room temperature in 1 hour to give a solid condensate (Condensate No. 2).

(3) Preparation of Condensate No. 3

In a reaction vessel, 16.65 moles of tetrahydrofuran (THF) was placed, then it was heated to 50° C. Thereto, 0.834 mole of 1,4-benzoquinone and 0.189 mole of 1,8-diaminonaphthalene were added with stirring. Subsequently, after stirring was stopped, the reaction mass was left to stand at 50° C. for 60 days to undergo condensation.

The product was filtered off from the reaction mixture and then washed with THF 5 to 6 times in order to remove unreacted 1,4-benzoquinone and 1,8-diaminonaphthalene, followed by drying to give a condensate (Condensate No. 3).

Examples of preparing condensate salts (sodium salts of sulfonation products of aromatic amine-based condensates)

Fifty g of Condensate No. 1 and 300 g of concentrated sulfuric acid were mixed at a temperature of 30° C. or less, and then the mixture was heated to 40° C. and stirred until the mixture came to dissolve in a dilute $NH_4OH$ quickly, so that sulfonation was carried out. Subsequently, the reaction mixture was poured in 1,000 ml of water, so that the sulfonation product was allowed to precipitate. It was filtered out and then washed with water. Thereafter, the sulfonation product was dispersed in 1,000 ml of water, and then it was dissolved therein by adding 11.3 g of 40 weight % NaOH solution in water therein. The solution obtained was evaporated to dryness. The resulting residue was ground to give 52.0 g of a sodium salt of the sulfonation product (Condensate salt No. 1).

The Condensate No. 2 and No. 3 were treated in the same manner as in the case of Condensate No. 1 to produce 55 g of a sodium salt of the sulfonation product (Condensate salt No. 2) and 48 g of a sodium salt of the sulfonation product (Condensate salt No. 3), respectively.

EXAMPLE 1

Polymerization was carried out in the following manner using a polymerization vessel with a inner capacity of 1,000 liters and having a stirrer.

In each experiment, first, a component (A), a component (B) and a component (C) were dissolved in a solvent as given in Table 1 to prepare a coating solution with a total concentration of 0.5% by weight. The coating solution was applied to the inner wall and other parts with which monomers come into contact during polymerization such as the stirring shaft, stirring blades and baffles. Then, the wet coated surfaces were dried by heating at 50° C. for 15 min., followed by washing with water. The (A) aromatic amine-based condensate, the (B) condensate salt, and the (C) dye or pigment used; the weight ratio of the component (A)/the component(B)/the component(C); and the solvent used in each experiment are given in Table 1. However, Experiment Nos. 101 to 111 are comparative examples in which no coating solution was applied, or a coating solution containing only one or two of the component (A), the component (B) and the component (C) was applied.

Next, in the polymerization vessel thus coated, were charged 400 kg of water, 200 kg of vinyl chloride, 200 g of sobitan monostearate, 200 g of hydroxypropylmethyl cellulose and 75 g of diisopropyl peroxydicarbonate. Then, polymerization was carried out at 57° C. with stirring for 6 hours. After the completion of the polymerization, the amount of polymer scale depositing on the inner wall of the polymerization vessel was measured. The results are given in Table 1.

TABLE 1

| Experiment No. | (A) No. of Condensate | (B) No. of Condensate salt | (C) Dye or pigment | (A)/(B)/(C) weight ratio | Solvent | Amount of Scale (g/m$^2$) |
|---|---|---|---|---|---|---|
| 101* | — | — | — | — | — | 1500 |
| 102* | 1 | — | — | 100/0/0 | Methanol | 45 |
| 103* | — | 2 | — | 0/100/0 | " | 1450 |
| 104* | — | — | C.I. Acid Black 2 | 0/0/100 | " | 200 |
| 105* | 1 | 2 | — | 100/300/0 | " | 5 |

TABLE 1-continued

| Experiment No. | Coating solution | | | | | Amount of Scale (g/m²) |
|---|---|---|---|---|---|---|
| | (A) No. of Condensate | (B) No. of Condensate salt | (C) Dye or pigment | (A)/(B)/(C) weight ratio | Solvent | |
| 106* | 1 | 3 | — | 100/200/0 | " | 3 |
| 107* | 2 | 1 | — | 100/5/0 | " | 5 |
| 108* | 2 | 3 | — | 100/30/0 | " | 3 |
| 109* | 3 | 1 | — | 100/150/0 | DMF | 4 |
| 110* | 3 | 2 | — | 100/70/0 | Methanol | 3 |
| 111* | 3 | 3 | — | 100/200/0 | " | 4 |
| 112 | 1 | 2 | C.I. Solvent Black 5 | 100/60/200 | " | 0 |
| 113 | 1 | 3 | C.I. Basic Red 15 | 100/300/100 | " | 0 |
| 114 | 2 | 1 | C.I. Acid Black 2 | 100/300/250 | " | 0 |
| 115 | 2 | 2 | C.I. Basic Orange 2 | 100/100/40 | " | 1 |
| 116 | 2 | 3 | C.I. Solvent Black 7 | 100/250/15 | DMF | 0 |
| 117 | 3 | 1 | C.I. Sulfur Orange 3 | 100/70/70 | " | 0 |
| 118 | 3 | 1 | C.I. Azoic Brown 2 | 100/100/10 | " | 0 |
| 119 | 3 | 2 | C.I. Acid Blue 59 | 100/50/150 | " | 1 |
| 120 | 3 | 3 | C.I. Solvent Red 21 | 100/50/200 | " | 1 |

EXAMPLE 2

A stainless steel polymerization vessel with an inner capacity of 100 liters and having a stirrer was coated with a coating solution in the same manner as in Example 1. The (A) aromatic amine-based condensate, the (B) condensate salt, and the (C) dye or pigment used; the weight ratio of the component (A)/the component(B)/the component(C); and the solvent used in each experiment are given in Table 2. However, Experiment Nos. 201 to 210 are comparative examples in which no coating solution was applied, or a coating solution containing only one or two of the components (A), the component (B) and the component (C) was applied.

Next, in the polymerization vessel thus coated, were charged 40 kg of water, 17 kg of vinyl chloride, 4 kg of vinyl acetate, 12 g of partially saponified polyvinyl alcohol, 4 g of hydroxypropylmethyl cellulose, 200 g of trichloroethylene, and 5 g of α,α'-azobis-2,4-dimethylvaleronitrile as a polymerization catalyst. Then, polymerization was carried out at 58° C. with stirring for 6 hours. After the completion of the polymerization, the amount of polymer scale depositing on the inner wall of the polymerization vessel was measured. The results are given in Table 2.

EXAMPLE 3

A stainless steel polymerization vessel with a inner capacity of 100 liters and having a stirrer was coated with a coating solution in the same manner as in Example 1. The (A) aromatic amine-based condensate, the (B) condensate salt, and the (C) dye or pigment used; the weight ratio of the component (A)/the component(B)/the component(C); and the solvent used in each experiment are given in Table 3. However, Experiment Nos. 301 to 310 are comparative examples in which no coating solution was applied, or a coating solution containing only one or two of the components (A), the component (B) and the component (C) was applied.

Next, in the polymerization vessel thus coated, were charged 40 kg of water, 500 g of sodium oleate, 13 kg of a polybutadiene latex (solid content: 45%), 9.0 g of styrene, 5.0 g of acrylonitrile, 40 g of tertdodecylmercaptane and 140 g of cumene hydroperoxide. After the inner temperature was raised to 65° C., 200 g of grape sugar, 2 g of ferrous sulfate, and 100 g of sodium pyrophosphate were charged. Then, polymerization was carried out at 65° C. with stirring for 5 hours. After the completion of the polymerization, the amount of polymer scale depositing on the inner wall of the polymerization vessel was measured. The results are given in Table 3.

TABLE 2

| Experiment No. | Coating solution | | | | | Amount of Scale (g/m²) |
|---|---|---|---|---|---|---|
| | (A) No. of Condensate | (B) No. of Condensate salt | (C) Dye or pigment | (A)/(B)/(C) weight ratio | Solvent | |
| 201* | — | — | — | — | — | 1800 |
| 202* | 2 | — | — | 100/0/0 | Methanol | 50 |
| 203* | — | 3 | — | 0/100/0 | " | 1700 |
| 204* | — | — | C.I. Basic Blue 3 | 0/0/100 | " | 1650 |
| 205* | 2 | 3 | — | 100/200/0 | " | 5 |
| 206* | 2 | 1 | — | 100/50/0 | " | 3 |
| 207* | 1 | 2 | — | 100/300/0 | " | 3 |
| 208* | 1 | 3 | — | 100/200/0 | " | 3 |
| 209* | 2 | 2 | — | 100/200/0 | DMF | 5 |
| 210* | 3 | 3 | — | 100/250/0 | Methanol | 6 |
| 211 | 1 | 2 | C.I. Basic Blue 3 | 100/150/25 | " | 0 |
| 212 | 1 | 2 | C.I. Basic Blue 9 | 100/100/50 | " | 0 |
| 213 | 1 | 3 | C.I. Solvent Black 5 | 100/200/5 | " | 0 |
| 214 | 2 | 1 | C.I. Acid Black 2 | 100/50/100 | " | 0 |
| 215 | 2 | 2 | C.I. Direct Blue 106 | 100/50/30 | " | 1 |
| 216 | 2 | 3 | C.I. Dispersed Blue 108 | 100/200/100 | " | 1 |
| 217 | 3 | 1 | C.I. Basic Blue 3 | 100/25/200 | " | 0 |
| 218 | 3 | 1 | C.I. Basic Red 27 | 100/200/50 | " | 0 |
| 219 | 3 | 2 | C.I. Basic Red 13 | 100/250/50 | " | 1 |
| 220 | 3 | 3 | C.I. Reactive Black 4 | 100/50/250 | DMF | 1 |

TABLE 3

| Experiment No. | Coating solution (A) No. of Condensate | (B) No. of Condensate salt | (C) Dye or pigment | (A)/(B)/(C) weight ratio | Solvent | Amount of Scale (g/m²) |
| --- | --- | --- | --- | --- | --- | --- |
| 301* | — | — | — | — | — | 600 |
| 302* | 1 | — | — | 100/0/0 | Methanol | 200 |
| 303* | — | 3 | — | 0/100/0 | " | 590 |
| 304* | — | — | C.I. Acid Black 2 | 0/0/100 | " | 590 |
| 305* | 1 | 3 | — | 100/250/0 | " | 4 |
| 306* | 1 | 2 | — | 100/50/0 | " | 6 |
| 307* | 2 | 1 | — | 100/5/0 | DMF | 7 |
| 308* | 3 | 1 | — | 100/30/0 | Methanol | 4 |
| 309* | 3 | 3 | — | 100/50/0 | " | 5 |
| 310* | 2 | 2 | — | 100/10/0 | " | 5 |
| 311 | 1 | 2 | C.I. Acid Black 2 | 100/50/100 | " | 1 |
| 312 | 1 | 3 | C.I. Solvent Black 7 | 100/100/200 | " | 1 |
| 313 | 2 | 1 | C.I. Solvent Red 23 | 100/200/10 | " | 1 |
| 314 | 3 | 1 | C.I. Solvent Black 5 | 100/10/50 | DMF | 1 |
| 315 | 3 | 2 | C.I. Basic Orange 2 | 100/150/30 | " | 1 |
| 316 | 2 | 2 | C.I. Pigment Red 3 | 100/200/10 | Methanol | 2 |
| 317 | 3 | 3 | C.I. Basic Black 8 | 100/100/200 | " | 2 |
| 318 | 2 | 3 | C.I. Solvent Black 3 | 100/100/10 | " | 2 |

EXAMPLE 4 on the inner wall of the polymerization vessel was measured. The results are given in Table 4.

TABLE 4

| Experiment No. | Coating solution (A) No. of Condensate | (B) No. of Condensate salt | (C) Metal compound or inorganic colloid | (A)/(B)/(C) weight ratio | Solvent | Amount of Scale (g/m²) |
| --- | --- | --- | --- | --- | --- | --- |
| 401* | — | — | — | — | — | 1500 |
| 402* | 1 | — | — | 100/0/0 | Methanol | 45 |
| 403* | — | 2 | — | 0/100/0 | " | 1300 |
| 404* | — | — | Aluminum hydroxide colloid | 0/0/100 | " | 700 |
| 405* | 1 | 2 | — | 100/200/0 | " | 5 |
| 406* | 1 | — | Aluminum hydroxide colloid | 100/0/100 | " | 20 |
| 407* | — | 2 | " | 0/100/100 | " | 25 |
| 408 | 1 | 2 | " | 100/100/250 | DMF | 0 |
| 409 | 2 | 3 | " | 100/200/30 | Methanol | 1 |
| 410 | 2 | 1 | " | 100/200/50 | " | 0 |
| 411 | 2 | 1 | Titanium sulfate | 100/250/100 | " | 0 |
| 412 | 2 | 2 | " | 100/50/200 | " | 1 |
| 413 | 3 | 2 | Ferrous hydroxide colloid | 100/50/200 | " | 1 |
| 414 | 3 | 3 | " | 100/200/40 | DMF | 0 |
| 415 | 3 | 1 | " | 100/300/100 | " | 0 |
| 416 | 3 | 1 | Stannic acid colloid | 100/300/150 | " | 0 |
| 417 | 3 | 2 | " | 100/5/170 | Methanol | 1 |
| 418 | 1 | 3 | " | 100/200/200 | " | 0 |
| 419 | 1 | 2 | Silicic acid colloid | 100/50/100 | " | 0 |
| 420 | 1 | 3 | " | 100/50/100 | " | 0 |

A stainless steel polymerization vessel with an inner capacity of 1,000 liters having a stirrer was coated in the same manner as in Example 1, except for the following conditions. The (A) aromatic amine-based condensate, the (B) condensate salt, and the (C) metal compound or inorganic colloid used; the weight ratio of the component (A)/the component(B)/the component(C); and the solvent used in each experiment are given in Table 4. However, Experiment Nos. 401 to 407 are comparative examples in which no coating solution was applied, or a coating solution containing only one or two of the component (A), the component (B) and the component (C) was applied.

Next, in the polymerization vessel thus coated, polymerization was conducted under the same conditions as in Example 1. That is, in the polymerization vessel were charged 400 kg of water, 200 kg of vinyl chloride, 200 g of sobitan monostearate, 200 g of hydroxypropylmethyl cellulose and 75 g of diisopropyl peroxydicarbonate. Then, polymerization was carried out at 57° C. with stirring for 6 hours. After the completion of the polymerization, the amount of polymer scale depositing

EXAMPLE 5

A stainless steel polymerization vessel with an inner capacity of 100 liters and having a stirrer was coated with a coating solution in the same manner as in Example 1. The (A) aromatic amine-based condensate, the (B) condensate salt, and the (C) metal compound or inorganic colloid used; the weight ratio of the component (A)/the component(B)/the component(C); and the solvent used in each experiment are given in Table 5. However, Experiment Nos. 501 to 507 are comparative examples in which no coating solution was applied, or a coating solution containing only one or two of the components (A), the component (B) and the component (C) was applied.

Next, in the polymerization vessel thus coated, polymerization was conducted under the same conditions as in Example 2. That is, in the polymerization vessel were charged 40 kg of water, 17 kg of vinyl chloride, 4 kg of vinyl acetate, 12 g of partially saponified polyvinyl alcohol, 4 g of hydroxypropylmethyl cellulose, 200 g of trichloroethylene, and 5 g of $\alpha,\alpha'$-azobis-2,4-dimethylvaleronitrile as a polymerization catalyst. Then, polymerization was carried out at 58° C. with stirring for 6 hours. After the completion of the polymerization, the amount of polymer scale depositing on the inner wall of the polymerization vessel was measured. The results are given in Table 5.

mer scale depositing on the inner wall of the polymerization vessel was measured. The results are given in Table 6.

TABLE 6

| | Coating solution | | | | | Amount of |
|---|---|---|---|---|---|---|
| Experiment No. | (A) No. of Condensate | (B) No. of Condensate salt | (C) Metal compound or inorganic colloid | (A)/(B)/(C) weight ratio | Solvent | Scale (g/m²) |
| 601* | — | — | — | — | — | 600 |
| 602* | 2 | — | — | 100/0/0 | Methanol | 350 |
| 603* | — | 1 | — | 0/100/0 | " | 590 |
| 604* | — | — | Silicic acid colloid | 0/0/100 | " | 590 |
| 605* | 2 | 1 | — | 100/5/0 | " | 20 |
| 606* | 2 | — | Silicic acid colloid | 100/0/50 | " | 100 |
| 607* | — | 1 | " | 0/5/50 | " | 130 |
| 608 | 2 | 1 | " | 100/5/50 | " | 2 |
| 609 | 3 | 2 | Stannic acid colloid | 100/250/250 | " | 1 |
| 610 | 3 | 1 | " | 100/100/100 | " | 1 |
| 611 | 3 | 2 | " | 100/150/50 | DMF | 1 |
| 612 | 3 | 3 | " | 100/300/15 | " | 2 |
| 613 | 1 | 2 | Ferrous hydroxide colloid | 100/5/150 | " | 2 |
| 614 | 1 | 3 | Titanium sulfate | 100/5/200 | Methanol | 1 |
| 615 | 1 | 3 | Aluminum hydroxide colloid | 100/200/80 | " | 2 |

TABLE 5

| | Coating solution | | | | | Amount of |
|---|---|---|---|---|---|---|
| Experiment No. | (A) No. of Condensate | (B) No. of Condensate salt | (C) Metal compound or inorganic colloid | (A)/(B)/(C) weight ratio | Solvent | Scale (g/m²) |
| 501* | — | — | — | — | — | 1800 |
| 502* | 1 | — | — | 100/0/0 | Methanol | 150 |
| 503* | — | 3 | — | 0/100/0 | " | 1500 |
| 504* | — | — | Aluminum hydroxide colloid | 0/0/100 | " | 150 |
| 505* | 1 | 3 | — | 100/100/0 | " | 10 |
| 506* | 1 | — | Aluminum hydroxide colloid | 100/0/100 | " | 20 |
| 507* | — | 3 | " | 0/100/100 | " | 25 |
| 508 | 1 | 3 | " | 100/100/100 | " | 0 |
| 509 | 1 | 2 | " | 100/100/100 | " | 0 |
| 510 | 2 | 1 | " | 100/50/200 | " | 0 |
| 511 | 2 | 2 | Ferrous hydroxide colloid | 100/50/15 | " | 0 |
| 512 | 2 | 3 | Silicic acid colloid | 100/100/50 | " | 0 |
| 513 | 3 | 1 | Titanium sulfate | 100/250/50 | " | 0 |
| 514 | 3 | 2 | " | 100/250/50 | " | 0 |
| 515 | 3 | 3 | " | 100/30/250 | " | 0 |

EXAMPLE 6

A stainless steel polymerization vessel with a inner capacity of 100 liters and having a stirrer was coated with a coating solution in the same manner as in Example 1. The (A) aromatic amine-based condensate, the (B) condensate salt, and the (C) metal compound or inorganic colloid used; the weight ratio of the component (A)/the component(B)/the component(C); and the solvent used in each experiment are given in Table 6. However, Experiment Nos. 601 to 607 are comparative examples in which no coating solution was applied, or a coating solution containing only one or two of the components (A), the component (B) and the component (C) was applied.

Next, in the polymerization vessel thus coated, polymerization was conducted under the same conditions as in Example 3. That is, in the polymerization vessel were charged 40 kg of water, 500 g of sodium oleate, 13 kg of a polybutadiene latex (solid content: 45%), 9.0 g of styrene, 5.0 g of acrylonitrile, 40 g of tertdodecylmercaptane and 140 g of cumene hydroperoxide. After the inner temperature was raised to 65° C., 200 g of grape sugar, 2 g of ferrous sulfate, and 100 g of sodium pyrophosphate were charged. Then, polymerization was carried out at 65° C. with stirring for 5 hours. After the completion of the polymerization, the amount of poly-

EXAMPLE 7

A stainless steel polymerization vessel with an inner capacity of 1,000 liters having a stirrer was coated in the same manner as in Example 1, except for the following conditions. The (A) aromatic amine-based condensate, the (B) condensate salt, and the (C)-1 metal compound or inorganic colloid, and (C)-2 dye or pigment used; the weight ratio of the component (A)/(B)/(C)-1/(C)-2; and the solvent used in each experiment are given in Table 7. However, Experiment Nos. 701 to 703 are comparative examples in which no coating solution was applied, or a coating solution containing only one or two of the component (A), the component (B) and the component (C) was applied.

Next, in the polymerization vessel thus coated, polymerization was conducted under the same conditions as in Example 1. That is, in the polymerization vessel were charged 400 kg of water, 200 kg of vinyl chloride, 200 g of sobitan monostearate, 200 g of hydroxypropylmethyl cellulose and 75 g of diisopropyl peroxydicarbonate. Then, polymerization was carried out at 57° C. with stirring for 6 hours. After the completion of the polymerization, the polymer produced was taken out of the polymerization vessel, which was then washed with water. The procedure from applying the coating solution through charging the materials and polymerizing to washing with water was repeated, and the number of polymerization runs which could be repeated before the amount of polymer scale depositing on the inner wall exceeded 1 g/m² (No. of scale prevented runs). The results are given in Table 7.

polymer scale depositing on the inner wall exceeded 1 g/m² (No. of scale prevented runs). The results are given in Table 8.

TABLE 8

| Exp. No. | (A) No. of Condensate | (B) No. of Condensate salt | (C-1) Metal compound or inorganic colloid | (C-2) Dye or pigment | (A)/(B)/(C-1)/(C-2) weight ratio | Solvent | No. of Scale Prevented Runs |
|---|---|---|---|---|---|---|---|
| 801* | — | — | — | — | — | — | 0 |
| 802* | 3 | — | — | — | 100/0/0/0 | Methanol | 0 |
| 803* | 3 | 1 | — | — | 100/200/0/0 | " | 0 |
| 804 | 3 | 1 | Titanium sulfate | — | 100/200/10/0 | " | 5 |
| 805 | 3 | 1 | — | C.I. Solvent Black 5 | 100/200/0/50 | " | 3 |
| 806 | 3 | 1 | Titanium sulfate | " | 100/200/10/50 | " | 50 |
| 807 | 3 | 2 | " | " | 100/200/5/5 | " | 41 |
| 808 | 3 | 3 | " | " | 100/5/100/100 | " | 32 |
| 809 | 2 | 2 | " | " | 100/5/100/10 | " | 30 |
| 810 | 1 | 2 | Ferrous hydroxide colloid | C.I. Acid Black 2 | 100/50/40/100 | " | 50 |
| 811 | 1 | 3 | Stilicic acid colloid | " | 100/30/20/150 | " | 45 |

TABLE 7

| Exp. No. | (A) No. of Condensate | (B) No. of Condensate salt | (C-1) Metal compound or inorganic colloid | (C-2) Dye or pigment | (A)/(B)/(C-1)/(C-2) weight ratio | Solvent | No. of Scale Prevented Runs |
|---|---|---|---|---|---|---|---|
| 701* | — | — | — | — | — | — | 0 |
| 702* | 1 | — | — | — | 100/0/0/0 | Methanol | 0 |
| 703* | 1 | 2 | — | — | 100/100/0/0 | " | 0 |
| 704 | 1 | 2 | Ferrous hydroxide colloid | — | 100/100/100/0 | " | 4 |
| 705 | 1 | 2 | — | C.I. Acid Black 2 | 100/100/0/50 | " | 5 |
| 706 | 1 | 2 | Ferrous hydroxide colloid | " | 100/100/100/50 | " | 45 |
| 707 | 2 | 2 | Aluminum hydroxide colloid | " | " | DMF | 30 |
| 708 | 2 | 3 | " | " | " | " | 32 |
| 709 | 3 | 1 | " | " | " | " | 43 |
| 710 | 3 | 2 | Stannic acid colloid | C.I. Basic Orange 14 | 100/20/200/50 | Methanol | 34 |
| 711 | 3 | 3 | " | " | " | " | 27 |
| 712 | 1 | 3 | Silicic acid colloid | C.I. Acid Blue 154 | 100/250/200/150 | " | 45 |
| 713 | 3 | 1 | Titanium sulfate | C.I. Solvent Black 5 | 100/200/5/100 | " | 42 |

EXAMPLE 8

A stainless steel polymerization vessel with an inner capacity of 100 liters and having a stirrer was coated with a coating solution in the same manner as in Example 1. The (A) aromatic amine-based condensate, the (B) condensate salt, and the (C)-1: metal compound or inorganic colloid, and (C)-2: dye or pigment used; the weight ratio of the component (A)/(B)/(C)-1/(C)-2; and the solvent used in each experiment are given in Table 8. However, Experiment Nos. 801 to 803 are comparative examples in which no coating solution was applied, or a coating solution containing only one or two of the components (A), the component (B) and the component (C) was applied.

Next, in the polymerization vessel thus coated, polymerization was conducted under the same conditions as in Example 2. That is, in the polymerization vessel were charged 40 kg of water, 17 kg of vinyl chloride, 4 kg of vinyl acetate, 12 g of partially saponified polyvinyl alcohol, 4 g of hydroxypropylmethyl cellulose, 200 g of trichloroethylene, and 5 g of α,α'-azobis-2,4-dimethylvaleronitrile as a polymerization catalyst. Then, polymerization was carried out at 58° C. with stirring for 6 hours. After the completion of the polymerization, the polymer produced was taken out of the polymerization vessel, which was then washed with water. The procedure from applying the coating solution through charging the materials and polymerizing to washing with water was repeated, and the number of polymerization runs which could be repeated before the amount of polymer scale depositing on the inner wall exceeded 1 g/m² (No. of scale prevented runs). The results are given in Table 8.

EXAMPLE 9

A stainless steel polymerization vessel with an inner capacity of 20 liters and having a stirrer was coated with a coating solution in the same manner as in Example 1, except for using, in each experiment, the same coating solution as used in the Experiment indicated in Table 9. However, Experiment No. 901 is a comparative experiment in which no coating solution was applied; Experiment No. 902 is a comparative experiment in which the same coating solution as used in Experiment No. 803 was used.

Next, in the polymerization vessel thus coated, were charged 7,500 g of water, 40 g of hydroxyapatite, 0.6 g of sodium dodecylbenzenesulfonate, 6,000 g of styrene, 1,200 g of acrylonitrile and 30 g of benzoyl peroxide. Then, the mixture was heated to 80° C. with stirring, and at that temperature polymerization was carrier out with stirring for 5 hours. After the completion of the polymerization, the amount of polymer scale depositing on the inner wall of the polymerization vessel was measured. The results are given in Table 9.

TABLE 9

| Experiment No. | Coating solution | Amount of Scale |
|---|---|---|
| 901* | — | 1250 |
| 902* | Experiment No. 803* | 50 |
| 903 | Experiment No. 804 | 35 |
| 904 | Experiment No. 706 | 0 |
| 905 | Experiment No. 709 | 1 |
| 906 | Experiment No. 712 | 1 |
| 907 | Experiment No. 713 | 0 |

| Experiment No. | Coating solution | Amount of Scale |
|---|---|---|
| 908 | Experiment No. 806 | 0 |
| 909 | Experiment No. 807 | 1 |
| 910 | Experiment No. 810 | 0 |

We claim:

1. A method of preventing polymer scale deposition in a polymerization vessel during polymerization of a monomer having an ethylenically double bond, wherein said polymerization is carrier out in a polymerization vessel of which the inner wall has been previously coated with a coating solution comprising:

(A) an aromatic amine-based condensate, (B) at least one member selected from the group consisting of alkali metal salts and ammonium salts of a sulfonation product prepared by sulfonation of an aromatic amine-based condensate, and (C) at least one member selected from the group consisting of metal compounds, inorganic colloids, dyes and pigments.

2. The method according to claim 1, wherein the component (A), the aromatic amine-based condensate is at least one member selected from the group consisting of:

(1) a condensate prepared by reacting an aromatic amine compound with an aromatic nitro compound in the presence of a condensation catalyst at 100° to 250° C., or the basic form thereof produced by treatment with an alkali metal salt or ammonium compound;

(2) a linear or branched polyaromatic amine with a molecular weight of at least 250 having the following formulas (III) or (IV).

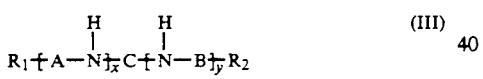

wherein $R_1$ and $R_2$ may be the same or different and each represent a hydrogen atom, —OH, —$NH_2$, or the group:

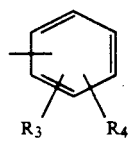

where $R_3$ and $R_4$ may be the same or different and each represent a hydrogen atom, —OH, —$NH_2$, a halogen atom, or an alkyl group having 1 to 8 carbon atoms, and A, B and C may be the same or different and each represent the group:

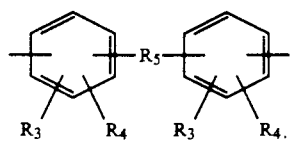

where $R_3$ and $R_4$ are the same as defined above, and $R_5$ is

or a linear or branched alkylene group or alkylidene group having 1 to 5 carbon atoms, or the group:

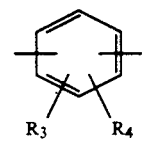

where $R_3$ and $R_4$ are the same as defined above, x is an integer of from 1 to 20, and y is an integer of from 0 to 20, and each repeated unit may be the same or different;

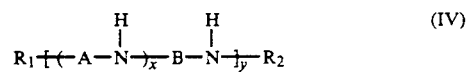

wherein $R_1$, A and B are the same as defined in respect of said formula (III), $R_2$ represents a hydrogen atom, —OH or the group:

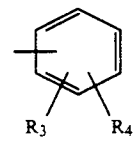

where $R_3$ and $R_4$ are the same as defined in respect of said formula (III), x is an integer of from 1 to 4, and y is an integer of from 1 to 15; and (3) a quinone-amine compound with an average molecular weight of at least 3,000 prepared by addition reaction of an aromatic amine with an aromatic quinone in a solvent having a solubility parameter of 9.0 to 12.2 or a mixed solvent containing said solvent and an alcohol in an amount not more than that of said solvent.

3. The method according to claim 2, wherein said condensate of (1) is a condensate of aniline with nitrobenzene.

4. The method according to claim 2, wherein said polyaromatic amine represented by the formula (IV) of (2) is a condensate of m-phenylenediamine with resorcinol.

5. The method according to claim 2, wherein said (c) quinone-amine compound of (3) is a condensate of diaminonaphthalene with benzoquinone.

6. The method according to claim 1, the component (B) is a sodium salt or an ammonium salt of the sulfonation product prepared by sulfonating the condensate of aniline with nitrobenzene, the condensate of m-phenylenediamine with resorcinol, or the condensate of m-phenylenediamine with resorcinol and at least one compound selected from the group consisting of p-aminophenol and phloroglucinol.

7. The method according to claim 1, wherein the component (C) comprises (C-1) at least one compound selected from the group consisting of metal compounds and inorganic colloids, and (C-2) at least one member selected from the group consisting of dyes and pigments, the ratio of the (C-1)/(C-2) being from 1/100 to 1000/100.

8. The method according to claim 1, wherein the component (C) is selected from the group consisting of silicates of magnesium, calcium, aluminum and titanium; phosphates of magnesium calcium, barium and titanium; sulfates of titanium, tin, iron and nickel; hydroxides of magnesium, calcium, aluminum and iron; and colloids of ferric hydroxide, aluminum hydroxide, stannic acid, silicic acid, aluminum hydroxide, and lithium silicate.

9. The method according to claim 1, wherein the (C) component comprises a quinoneimine dye.

10. The method according to claim 1, wherein the coating solution contains the component (B) in an amount of 1 to 500 parts by weight and the component (C) in an amount of 5 to 1,000 parts by weight per 100 parts by weight of the component (A).

11. The method according to claim 1, wherein said coating solution has been previously applied to parts of the polymerization vessel with which the monomer comes into contact during polymerization other than its inner wall surface and then dried to form a coating.

12. The method according to claim 15, wherein said parts with which the monomer comes into contact are selected from the group consisting of a stirring shaft, stirring blade, baffle, header, search coil and condenser.

13. The method according to claim 1, wherein said coating solution has been further previously applied to parts of the recovery system of an unreacted monomer with which the monomer comes to contact during polymerization and then dried to form a coating.

14. The method according to claim 1, wherein the coating formed has a coating weight of from 0.001 to 5 $g/m^2$.

15. The method according to claim 1, wherein the monomer is at least one member selected from the group consisting of vinyl halides; vinyl esters; acrylic acid and methacrylic acid, or esters or salts of these; maleic acid or fumaric acid, and esters or anhydrides thereof; diene monomers; aromatic vinyl compounds; acrylates; acrylonitrile; halogenated vinylidenes; and vinyl ethers.

16. The method according to claim 1, wherein said polymerization is carried out as suspension polymerization, emulsion polymerization, solution polymerization or bulk polymerization.

17. A polymer scale preventive agent comprising
(A) an aromatic amine-based condensate,
(B) at least one member selected from the group consisting of alkali metal salts and ammonium salts of a sulfonation product prepared by sulfonation of an aromatic amine-based condensate, and
(C) at least one member selected from the group consisting of metal compounds, inorganic colloids, dyes and pigments.

18. A polymerization vessel of which the inner wall has a coating comprising:
(A) an aromatic amine-based condensate,
(B) at least one member selected from the group consisting of alkali metal salts and ammonium salts of a sulfonation product prepared by sulfonation of an aromatic amine-based condensate, and
(C) at least one member selected from the group consisting of metal compounds, inorganic colloids, dyes and pigments.

* * * * *